(12) United States Patent
Leroy (10) Patent No.: US 6,406,515 B1
(45) Date of Patent: Jun. 18, 2002

(54) PROCESS AND DEVICE FOR PURIFICATION OF ALUMINUM BY SEGREGATION

(75) Inventor: Michel Leroy, Paris (FR)

(73) Assignee: Aluminium Pechiney, Paris (FR)

( * ) Notice: Subject to any disclaimer, the term of this patent is extended or adjusted under 35 U.S.C. 154(b) by 0 days.

(21) Appl. No.: 09/897,963

(22) Filed: Jul. 5, 2001

Related U.S. Application Data (63) Continuation of application No. PCT/FR00/00010, filed on Jan. 5, 2000.
(51) Int. Cl.[7] .............................. C22B 9/00; C22B 21/00
(52) U.S. Cl. ........................ 75/679; 75/10.12; 266/92
(58) Field of Search ............................ 75/10.12, 679; 266/92

(56) References Cited

U.S. PATENT DOCUMENTS

| 4,221,590 A | 9/1980 | Dawless et al. |
| 4,456,480 A | 6/1984 | Wintenberger |
| 4,734,127 A | 3/1988 | Iuchi et al. |
| 5,573,574 A | * 11/1996 | Leroy ........................ 75/679 |

FOREIGN PATENT DOCUMENTS

JP 05 125463 5/1993

* cited by examiner

*Primary Examiner*—Melvyn Andrews
(74) *Attorney, Agent, or Firm*—Dennison, Scheiner & Schultz (57) ABSTRACT

An aluminum bloom more than 99.95% pure is obtained by segregation of aluminum from an impure parent liquor. Heat supplied to the parent liquor during growth of the bloom is adjusted as a function of the height of the bloom.

37 Claims, 7 Drawing Sheets

PROCESS AND DEVICE FOR PURIFICATION OF ALUMINUM BY SEGREGATION

This application is a continuation of International application Ser. No. PCT/FR00/00010 filed Jan. 5, 2000.

BACKGROUND OF THE INVENTION

1. Field of the Invention

The invention relates to the purification of aluminum by segregation. In particular it relates to processes and devices for purification by segregation capable of providing very high purity aluminum, namely aluminum with a purity exceeding 3N 5, in other words containing more than 99.95% of aluminum.

2. Discussion of the Background

Aluminum purification processes by segregation are designed to obtain aluminum with a low content of eutectic elements such as copper, iron, silicon, magnesium, gallium or zinc. These processes are based on the fact that partial solidification of a mass of impure liquid aluminum (called the parent or mother liquor) tends to concentrate eutectic elements in the liquid mass and to produce crystals with a content of eutectic elements significantly lower than that of the parent liquor. Thus, the basic principle of known segregation processes consists of encouraging partial crystallization of a mass of impure liquid aluminum, and physically separating the two phases so as to isolate the purified metal from the residual parent liquor enriched in eutectic elements.

Several processes have been developed around this basic principle. Typically, after placing the charge of impure liquid aluminum in a thermally insulated refractory receptacle, the formation of fine crystals is induced in the upper part of the liquid aluminum by local cooling of the liquid aluminum, and a gradual accumulation of crystals is then induced in the lower part of the receptacle under the effect of gravity, and the purification process is stopped when a given fraction of the parent liquor has been crystallized and the purified crystals are then separated from the residual parent liquor.

According to American patent U.S. Pat. No. 3,211,547, the crystals are formed on the surface of the mass of liquid aluminum by controlled cooling of the mass, and then detach and accumulate at the bottom of the receptacle under the action of gravity. Partial tamping (or compaction) of the mass of crystals takes place at regular intervals throughout the crystallization phase. Compaction of the mass of crystals accumulated at the bottom of the receptacle during crystallization can significantly improve the purification rate achieved by the process. At the end of the crystallization phase, all residual parent liquor is evacuated by pouring in the liquid phase, preferably through an orifice located at the surface above the mass of purified aluminum crystals accumulated at the bottom of the receptacle, and the said accumulated mass of crystals is then recovered by melting it and allowing it to flow in the liquid phase through an orifice located near the bottom of the receptacle.

According to French patent FR 1 594 154 (corresponding to American patent U.S. Pat. No. 3,671,229), crystals form on the external surface of a closed graphite tube adjacent to the part immersed in the parent liquor. A cooling gas circulates in the said tube to trigger crystallization. A graphite ring held in the liquid aluminum periodically scrapes the outside surface of the tube, thus detaching crystals formed on it. The crystals accumulate at the bottom of the crucible under the effect of gravity and the accumulated mass of crystals is regularly compacted using the said ring. The tube is gradually raised as solidification progresses. At the end of the crystallization phase, the purified solid mass (called the "bloom") is then separated from the residual liquid mass enriched in eutectic elements, for example by siphoning of the residual parent liquor or by tipping the crucible. According to French patent FR 2 592 663 (corresponding to American patent U.S. Pat. No. 4,744,823), the purification coefficient of this process can be further increased by tipping the receptacle to allow the residual parent liquor to pour off, and keeping it in the tipped positioned to eliminate the residual interstitial liquid by dripping.

According to French patent FR 2 524 489 (corresponding to American patent U.S. Pat. No. 4,456,480) and American patent U.S. Pat. No. 4,221,590, the crystals accumulated at the bottom of the crucible during the crystallization and crystal compaction phase are remelted, which induces additional purification of the metal which can give purification coefficients exceeding theoretical values.

According to Japanese patent JP 58-167733, the purified aluminum crystals are formed at the periphery of the internal surface of the crucible in a determined area located below the free surface of the liquid aluminum, by means of a cooling device comprising a stainless steel pipe in which cool air circulates. The part of the liquid aluminum located above the cooling area is heated to prevent it from solidifying. Crystals formed in the forced cooling area are detached using a graphite piston with a cross-section approximately the same as the cross-section of the crucible and continuously immersed in the liquid aluminum, which periodically scrapes the surface of the crucible and encourages their accumulation at the bottom of the crucible. The piston is also used to compact the crystals accumulated at the bottom of the crucible. Ducts formed in the piston enable crystals to flow towards the bottom of the crucible and liquid metal to flow during piston movements. The mass of solidified metal is partially remelted using heating means. When the mass of accumulated crystals has reached the cooling area, the piston is emersed, the parent liquor is withdrawn by siphoning and the solid mass is extracted from the crucible, and then cut as a function of the required purity.

The purity of blooms produced industrially according to the state of the art is non-uniform. In particular, a purity gradient is observed between the top and the bottom of the blooms. It is known that the top part of the final bloom that contains more impurities than the lower part can be sawn, to keep only the lower part for applications requiring the highest purity levels. Typically, the sawing operation eliminates 15% to 30% of the final bloom. However, this solution has the disadvantage that it eliminates a large proportion of the blooms obtained, consequently reducing the effective productivity of a plant and generating scrap that complicates metal stock management.

The present inventor has also observed that blooms obtained industrially usually have purity variations between the core and the periphery, the metal at the periphery being purer than the metal in the core of the bloom. In general, the higher activity of large crucibles varies inversely with the purity of the product obtained. For example, the effective purification coefficients K (over the entire bloom) observed for iron (KFe) and for silicon (KSi) on 800 mm diameter crucibles, were often less than 50% of the purification coefficients obtained (at an identical rise speed) for 600 mm diameter crucibles. It can be difficult to extract the high purity metal by a simple sawing operation with this type of essentially radial heterogeneity.

Apart from these heterogeneities, the present inventor has observed significant variations in the time necessary to obtain a bloom with predetermined mass, between one operation and the next. These variations, which are due to different causes (such as equipment wear and variations in thermal conductivity) affect the effective productivity of an industrial site and complicate the work organization and internal procedures.

Finally, the present inventor has observed that the productivity and the average effective purification rate vary inversely to each other. Thus, a reduction in the purification rate is observed when the productivity is increased, and conversely the productivity drops when the purification rate is increased. This constraint significantly limits the margin of maneuver in industrial production and also adversely affects production costs.

Therefore the present inventor searched for solutions in simple devices and processes that could widen the limits of the compromise between the purification rate and productivity, and reduce heterogeneities and purity variations in industrially obtained blooms, in order to globally reduce investment, production and maintenance costs.

SUMMARY OF THE INVENTION

The present invention provides a process for the purification of aluminum by segregation in order to form a solid mass (or bloom) with very high purity (namely greater than 3N5, in other words containing more than 99.95% of aluminum) starting from a mass of impure liquid aluminum called the "parent liquor", comprising the formation of crystals by partial crystallization, periodic compaction of the bloom and essentially continuous remelting of the bloom by heating during growth, and characterized in that it comprises a periodic measurement of the height H of the bloom during growth and adjustment of the heating power as a function of the measured height H.

The present invention also provides a device for the purification of aluminum, capable of forming a mass of very high purity solid aluminum (or "bloom") by segregation, comprising a refractory crucible, a furnace equipped with crucible heating means, means of remelting the said bloom by heating during growth, and at least one compaction means, and characterized in that it comprises means of measuring the height H of the said solid mass during growth, and means for controlling the heating power of the said heating means as a function of the said measured height H.

The present inventor has observed that, unexpectedly, heterogeneities in the purity of the final bloom and the variability from one bloom to another were actually related to the heating power injected during the segregation process and that prior practice that consisted of injecting an approximately constant heating power without retroactive (feedback) adjustment during growth of the bloom, led to significantly greater heterogeneities and purity variations than are observed when the heating power is varied gradually according to the invention. The present inventor also observed that control of the heating power throughout the bloom growth period not only reduced heterogeneities and variations in the purity, but also widened the limits of the compromise between the purification rate and the productivity.

DETAILED DESCRIPTION OF PREFERRED EMBODIMENTS

According to the invention, the process for purification of aluminum by segregation designed to enable the formation of a very high purity solid mass (or "bloom") by growth from a liquid aluminum mass called the parent liquor, and comprising the formation of crystals by partial crystallization, periodic compaction of the bloom and the accumulated crystals, and remelting of the bloom by heating during growth, is characterized in that it comprises a periodic measurement of the height H of the bloom and adjustment of the heating power as a function of the measured height H.

According to one preferred embodiment of the invention, the process for purification of aluminum by segregation is carried out in a device comprising a refractory crucible, means of heating the crucible, at least one means of compaction, means of displacing the at least one compaction means vertically, and detachment means, and comprises an operation in which the solid purified aluminum mass called the "bloom" is grown in the bottom of the crucible, starting from a liquid aluminum mass called the parent liquor, the growth operation comprising:

the formation of aluminum crystals by crystallization over at least one specific surface of the device, called the crystallization zone, in which the temperature is less than the liquidus temperature of the parent liquor, detachment of the crystals using the detachment means, migration (or drop) of the crystals towards the bottom of the crucible under the effect of gravity, accumulation of the crystals at the top surface o the solid mass, compaction of the accumulated crystals and the solid mass, by means of the (each) compaction means, partial remelting of the solid mass during growth, using the heating means, the process being characterized in that it comprises:

a measurement of the height H of the bloom during the growth operation, adjustment of the heating power P as a function of the measured height H.

Preferably, the adjustment is made so as to obtain a determined variation in the rate of change of the height, which preferably decreases with time.

The process usually begins by loading a given initial mass of liquid aluminum to be purified into the refractory crucible, and bringing the assembly into thermal equilibrium. It is advantageous to include an additional step of preheating the crucible and the compaction means located in the low position in the crucible before loading it with liquid aluminum, in order to avoid thermal shocks to the materials and so that the assembly can come into thermal equilibrium faster.

Impurities extracted from the metal during crystallization and during partial remelting accumulate in the residual parent liquor, whose impurity content increases continuously.

Furthermore, at the end of the growth operation, the process usually comprises a physical separation of the residual parent liquor and the final bloom. This separation operation is preferably carried out when the bloom has reached a predetermined height Hf. It could also be carried out when a determined fraction F of the initial mass of liquid aluminum has solidified, where F is preferably between 50 and 80%, and more preferably between 60 and 75%.

This physical separation may be carried out in several ways. It is preferably carried out by tipping the crucible followed by prolonged dripping of the impure liquid (in other words the residual parent liquor) that remained occluded between the crystals. Advantageously, after the end of the purification operation, the crucible is extracted from the furnace with its metallic container and is placed on a tipper that drains the impure residual parent liquor and drains the liquid contained between the crystals. It would also be possible to scrape the upper part of the bloom during this dripping, for example using a graphite spiral, to eliminate the zone with the highest content of residual impure liquid.

The process may comprise an additional operation to saw the top and/or bottom of the rough (or raw) bloom, in other words the bloom removed from the crucible and cooled to a temperature at which it can be handled (typically ambient temperature). The sawing operation is usually carried out on a dripped rough bloom, in other words after carrying out an operation in which the impure residual liquid is allowed to drip and the remaining solid is cooled.

The height H may be measured using compaction means, which significantly simplifies the device so that the complexity of the mechanisms in the device can be significantly reduced, reducing the basic investment cost and maintenance costs correspondingly.

According to a preferred embodiment of the invention, crystals are formed both on the inside surface of the crucible and on part of the (each) compaction means. The crystals are preferably formed in specific crystallization zones.

For the formation of crystals on the (each) compaction means, the present inventor has found it particularly advantageous if part of the (or each) compaction device is alternately immersed into and emersed from (i.e., drawn out of) the parent liquor, in order to cool a specific part of the (each) compaction means called the crystallization zone, down to a temperature below the liquidus temperature of the parent liquor during emersion, so that crystals are formed in the zone during immersion. Cooling may be obtained simply by radiation and/or natural or forced convection. The immersion time Ti and the emersion time Te may be fixed or variable.

The present inventor has observed that alternate immersion and emersion of the compaction means designed to detach crystals also increased the number of crystals formed on the compaction means. This increase is higher when the ratio of the emersion time Te to the immersion time Ti is higher. More precisely, this increase is greater when the ratio of the time Tr spent in the high position (cooling position) to the time Tc spent in the low position (compaction and crystallization position) is high, while the absolute value of the time spent in the low position drops significantly. Thus, the emersion time Te is preferably greater than the immersion time Ti. More precisely, the time spent by the compaction means in the high position Tr is preferably greater than the time spent in the low position Tc. The present inventor has observed that the mass of crystals formed on the shaft increased as Tr/Tc increased, and decreased as Tr+Tc increased.

For example, for a furnace with a capacity of 2 tons, the applicant compared one elementary cycle (A) for which Ti=30 sec and Te=8 sec, and one elementary cycle (B) for which Ti=15 sec and Te=23 sec, the rise and fall rate of the shaft between the high and low positions being about 0.20 m/sec for both cycles, and observed that the crystal production ratio for cycle B is 40 kg/hour greater than the production rate for cycle A, if the same set value curve is used for bloom growth. This increase in the crystal production rate for the same growth curve is accompanied by an increase in the average heating power by 4.5 kW and leads to a higher remelting rate of the crystals formed for elementary cycle B than for cycle A. These differences increase the purity of the metal for constant productivity. Typically, since the average iron and silicon contents of blooms made according to cycle B are 30% less than for blooms made according to cycle A (for the same final bloom size and for the same total operation time), which represents a considerable difference between the purification rates.

The emersion and immersion sequence forms an elementary purification cycle. The duration of each elementary cycle may be variable or it may be approximately constant. The duration of each cycle is preferably between 20 seconds and 5 minutes. If the duration is too short, the quantity of crystals formed during each elementary cycle will be small, making satisfactory detachment (or scalping) of these crystals more difficult. If the duration is too long, the crystal coats formed during each elementary cycle will be too thick and too hard, sometimes with the effect of blocking the scalpers and reducing the quantity of crystals formed per unit time.

The compaction operation preferably includes pressurization of the solid mass using the (each) compaction means and maintaining the pressure during a time period Tc approximately equal to the immersion time Ti (preferably equal to at least 95% of Ti). The compaction means is preferably kept in the high position during a period Tr approximately equal to the emersion time Te (preferably equal to at least 95% of Te).

The immersion depth of the compaction means depends on the height H of the solid mass: it is greater at the beginning of the purification operation, and then gradually reduces as the solid mass grows. The compaction operation compresses the solid mass (22) and crushes the accumulated crystals (21) on its upper surface, by expelling a proportion of the impure liquid contained between the crystals. Furthermore, by compressing the bloom, this compaction brings new solid parts into contact with the hot walls and facilitates partial remelting. The compaction operation preferably comprises a single compression movement of the (each) compaction means during a time Tc, followed by the measurement of the height H(t) of the compacted solid mass.

Figure 5:
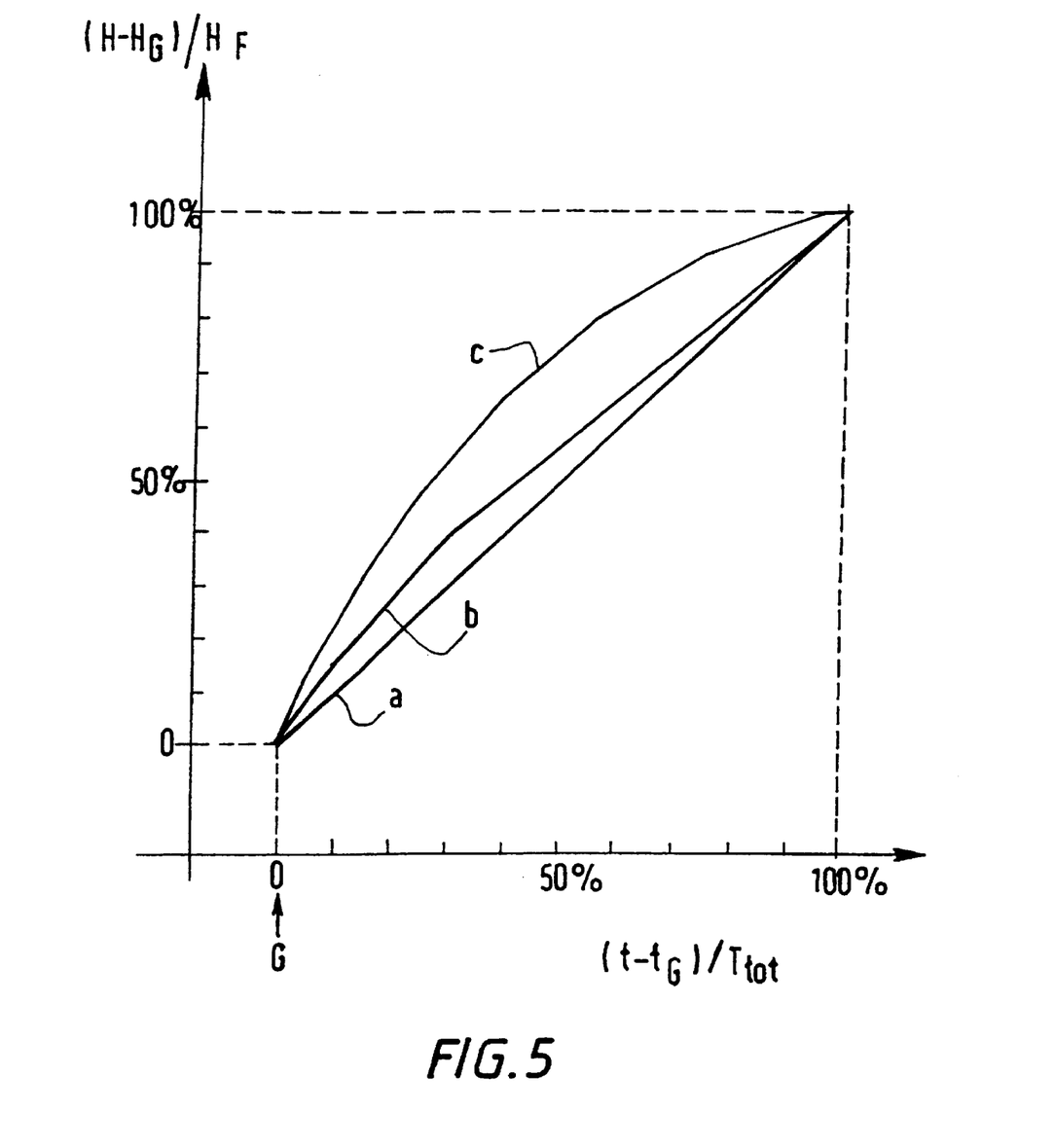
FIG. 5 shows solid mass growth curves, in other words curves of the variation of the height of the solid mass as a function of time, according to prior art (a) and according to the invention (b, c).

In practice, when the height is measured using the compaction means, it can only be measured starting from the moment at which the solid mass has reached a certain minimum height Hm corresponding to the lowest point that can be reached by the compaction means—this time is called the "contact time" (identified by the letter G in FIG. 5). It is practical to measure the time t starting from the contact time.

The operation to detach crystals on the crucible and on the (each) compaction means may be carried out when the (each) compaction means is emersed. The operation to detach crystals on the (each) said compaction means may also be carried out while the (each) said compaction means is being emersed.

Crystals migrate towards the bottom of the crucible preferably mainly during the emersion period Te of the (each) compaction means.

Figure 1:
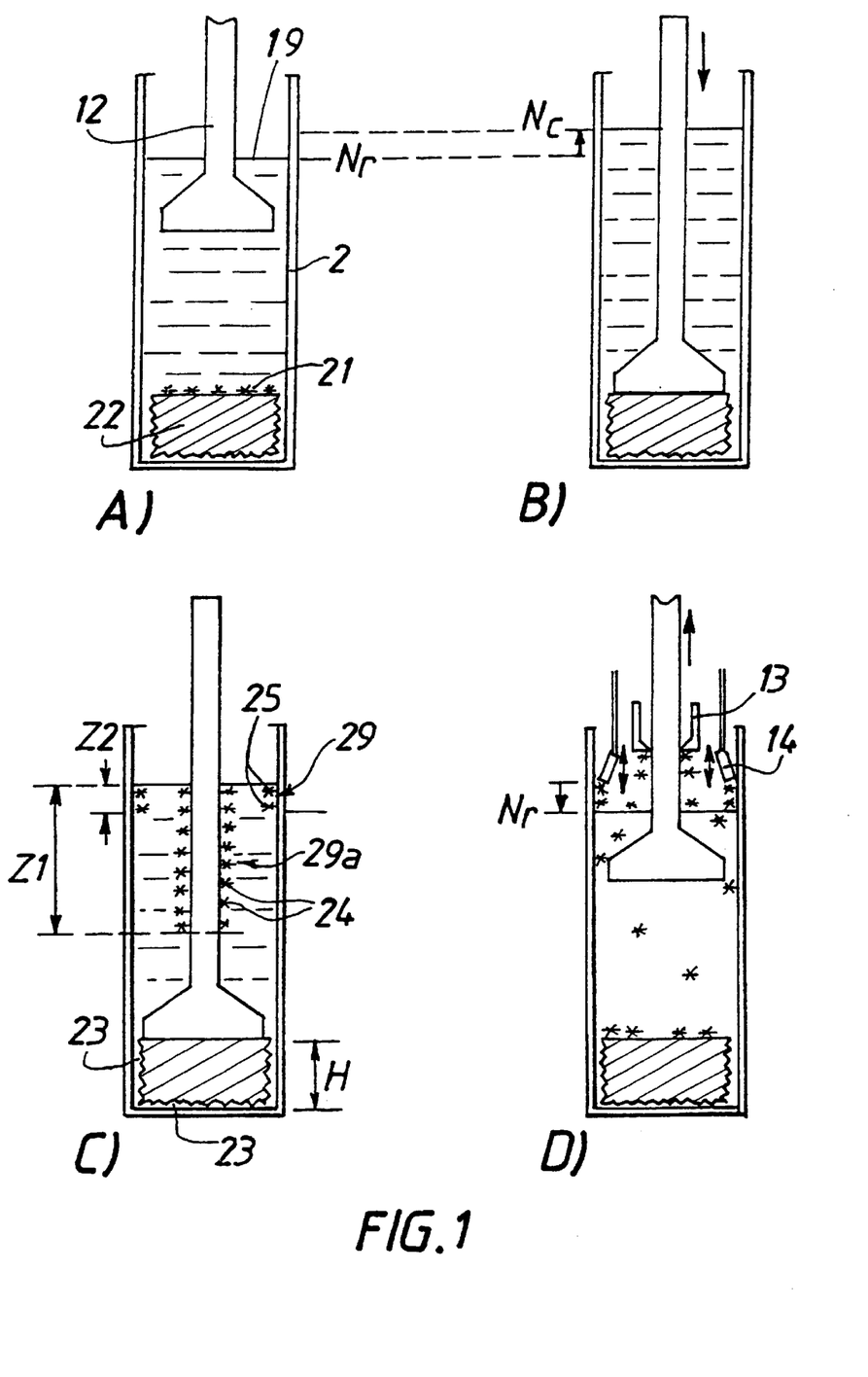
FIG. 1 diagrammatically illustrates an elementary purification cycle according to a preferred embodiment of the process according to the invention.
Figure 2:
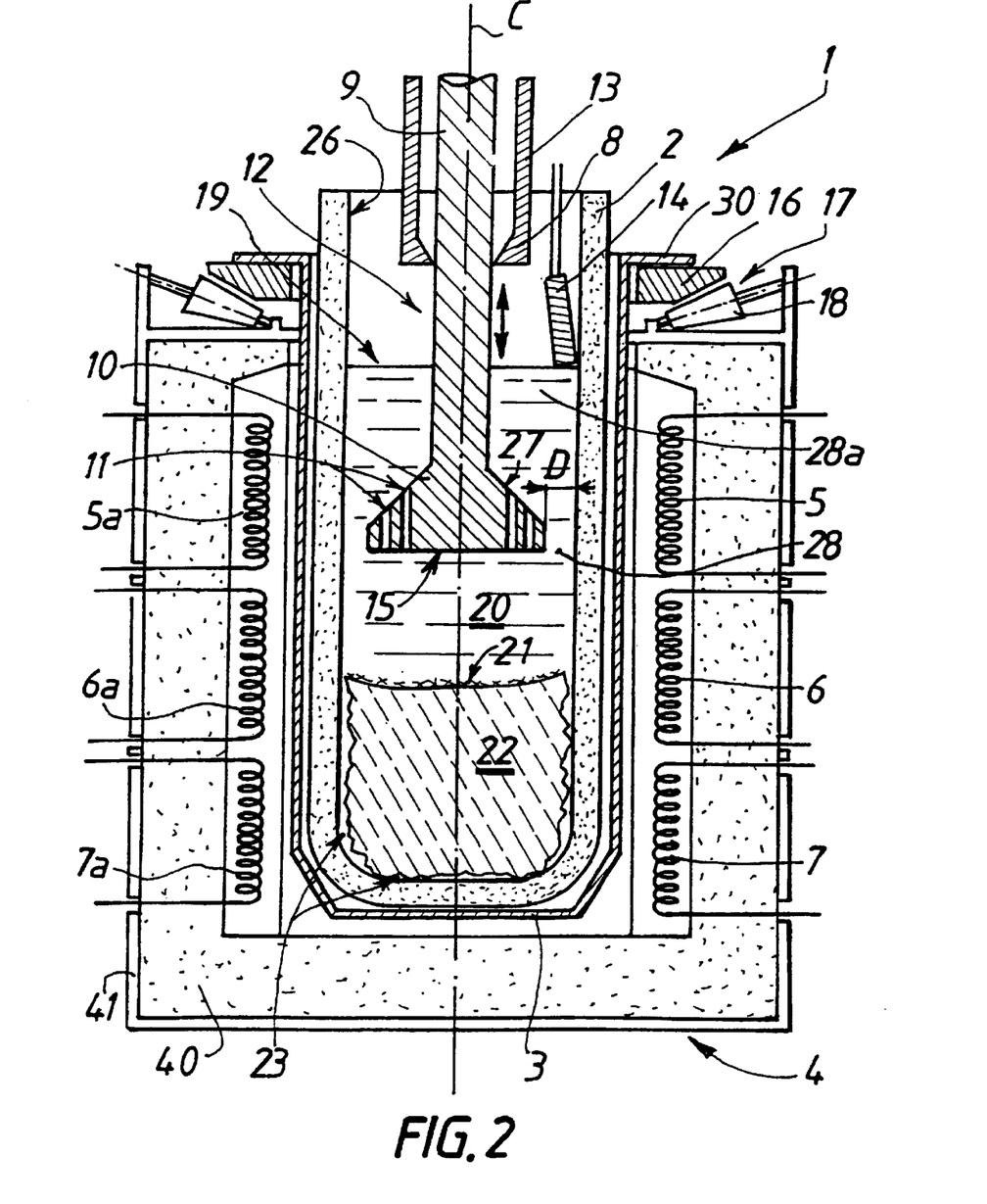
FIG. 2 illustrates a purification device by segregation according to a preferred embodiment of the invention.
Figure 3:
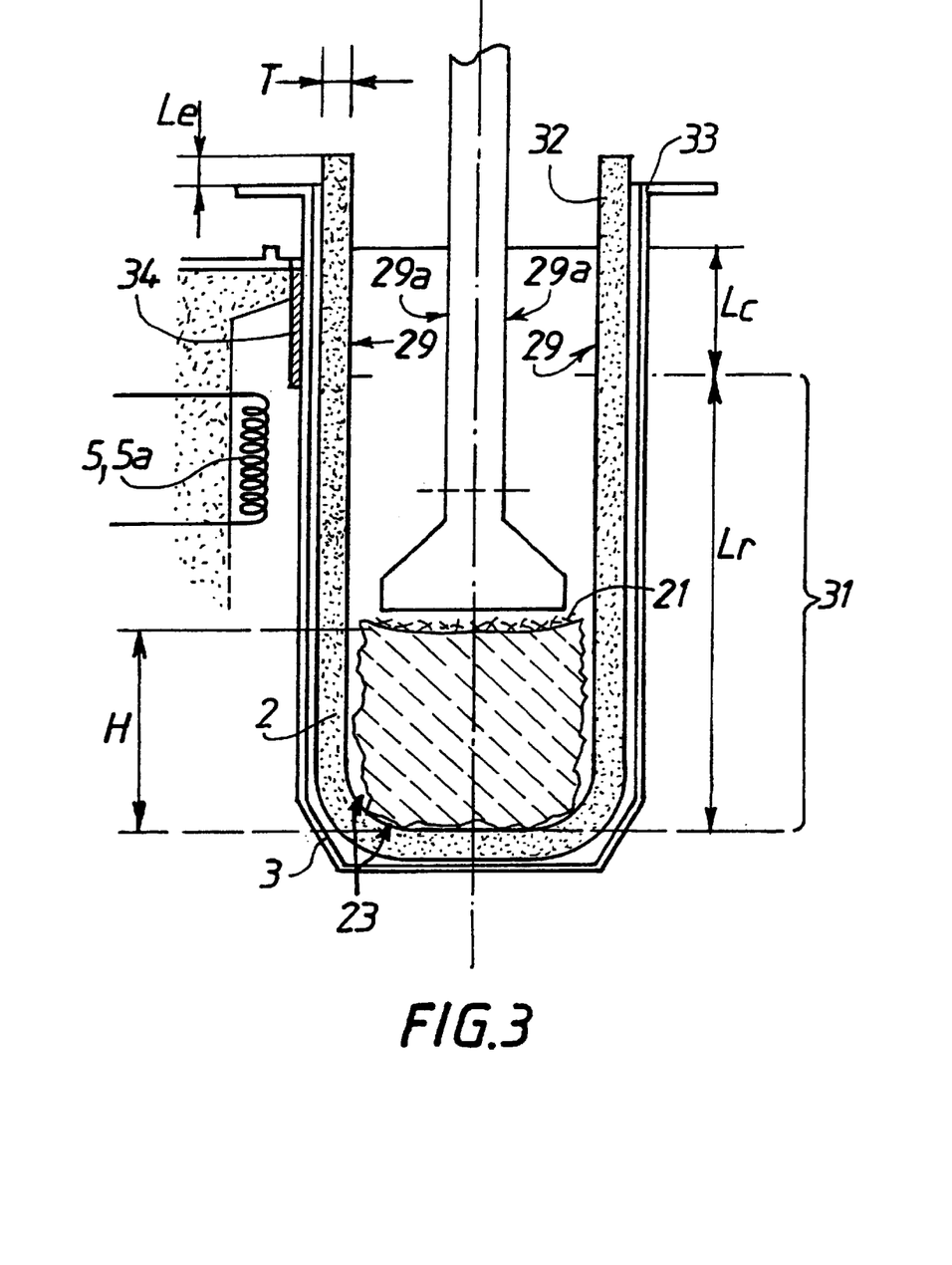
FIG. 3 shows crystallization and remelting areas in the crucible when the compaction means is in the low, or crystallization, position.

The remelting operation of the solid mass during growth is an approximately continuous process. In practice, remelting only occurs around the compacted solid mass (22), such that the effective remelting area (23) covers the bottom of the crucible and its sidewall up to a height H. Remelting occurs over approximately the entire peripheral surface of the solid mass (22), including the upper part of this surface at the level of the crystal accumulation area (21) as shown in FIGS. 1 to 3. The adjustment of the heating power P, which depends on the measured height H of the solid mass (22), at least modifies the power applied adjacent to the entire solid mass. According to the invention, the remelting rate of the said solid mass varies during the complete purification operation and preferably follows a determined progression. The present inventor has observed that the average purification rate can be significantly increased if the curve of the remelting rate varies such that the ratio between the mass Mr of remelted crystals and the mass Mc of crystals formed (Mr/Mc) is, for each elementary cycle, a non-decreasing function of the height H(t) of the compacted mass, in other words of the solid mass after the compaction operation, as a function of the time t. In other words, the target remelting rate is constant or increases when the height H(t) increases. The initially produced mass Mc is equal to the sum of the mass after remelting and the remelted mass. Remelting can also be expressed in terms of a wash rate, which is equal to the ratio between the remelted mass and the remaining mass after partial remelting.

A remelting rate of this type gives a non-linear and convex target growth curve Ho(t) for the solid mass, in other words a curve with a decreasing or zero slope (a typical curve is illustrated in FIG. 5). In other words, the rate of increase of the height H(t) decreases with time. The growth curve according to the invention is advantageously obtained by regulating the power of heating means using the value of the height H(t) of the solid mass measured in each elementary cycle, that is compared with the set value Ho(t) (that corresponds to the typical required growth curve of the compacted mass with time) Typically, when the value H(t) measured over a few consecutive elementary cycles exceeds the set value Ho(t), the heating power is increased, and when it is less than the set value Ho(t) the heating power is reduced. Preferably, the said regulation takes account of the difference between the height H(t) actually measured (preferably an average over several minutes or over a few consecutive elementary cycles (sliding mean)) and the set value Ho(t), and the trend of this difference in time (increasing or reducing), particularly in order to eliminate "oscillation" regulation phenomena. Thus, it was found advantageous to adjust the heating power P as a function of the difference between the measured height H and a set value Ho, in other words to control the power P as a function of H−Ho, where Ho is a predetermined set value that depends on the time elapsed since the contact time.

Also preferably, the increment in the power P imposed at a moment t is of the following form:

$$\Delta P(t) = A \times (H(t) - Ho(t)) + B \times \{\Delta(H(t) - Ho(t))/\Delta t\},$$

where A and B are positive empirical coefficients that are adjusted such that the set height can be reached quickly, but that do not induce "oscillation" around this set height, despite the inevitable thermal inertia of the device (a few minutes is usually necessary before a power increment results in an inflection in the crystal rise curve). The heating power is advantageously regulated by a computerized system.

Surprisingly, the present inventor observed that for a given productivity, in other words by fixing a given duration for the complete segregation operation (and therefore to obtain a bloom with a given weight), the means of controlling the-cycle and particularly the equation expressing the rate at which the bloom is made to grow as a function of the height of the previously compacted bloom (or solid mass), had a significant importance on the average purity of the final bloom obtained. In other words, unexpected, controlling the heating power to increase the compacted bloom height according to particular rules can significantly increase the purification coefficients obtained for a given productivity.

The free space left between the (each) compaction means and the inside wall of the crucible is preferably such that detached crystals are affected by a washing phenomenon as they fall towards the bottom of the crucible. This phenomenon occurs when crystals pass close to the wall, in an area in which the liquid aluminum temperature is slightly higher than the liquidus temperature, which causes partial remelting of the surface of the crystals, since the surface is richer in impurities than the core, thus improving purification.

According to one variant of the invention, the dimensions of the (each) compaction means and the crucible are such that the free area of the liquid aluminum rises so as to cover practically the entire crystallization area over the internal wall of the crucible when the (each) compaction means is in the low (immersed) position, and such that the free surface of the liquid aluminum drops such that the upper part of the ring of crystals (25) formed in the said area at least partially emerges from the liquid metal when the compaction means is in the high (emersed) position and such that these crystals can be detached without the detachment means (and more precisely the scrapers themselves) entering into the liquid metal. This variant of the invention can reduce scraper wear, making work necessary on detachment means less frequent, facilitating maintenance of the device and reducing risks of pollution of the parent liquor, which gives a higher and better controlled purification rate.

As shown in FIG. 1, according to a preferred embodiment, the purification process by segregation according to the invention is characterized in that it includes:

carrying out elementary purification cycles leading to the formation of a solid mass of purified aluminum (22) that goes down to the bottom of the crucible (2), each cycle includes the following steps:

keep the compaction means (12) in the high position for a time Tr, the free surface (19) of the liquid aluminum being at a level Nr (FIG. 1A)

lower the compaction means (12) and pressurize the solid mass (22) and crystals (21) accumulated on its upper surface by the compaction means, the free surface (19) of the liquid aluminum being increased to level Nc (FIG. 1B);

maintain the said pressure during the formation of crystals (24, 25), both on the compaction means and on the surface of the crucible, in the said crystallization areas (29, 29a), during a time interval Tc that is preferably fixed (FIG. 1C);

measure the height H of the solid mass using the compaction means;

raise the compaction means to the high position, called the cooling position, the free surface (19) of the liquid aluminum having dropped down to level Nr;

perform a crystal detachment operation by detachment means (13, 14), preferably outside the liquid aluminum, the crystals thus detached then migrating towards the bottom part of the said crucible under the action of gravity (FIG. 1D)

continuous partial remelting of the solid mass;

adjustment of the heating power P as a function of the height H;

stopping the elementary purification cycles when the solid mass has reached a predetermined height Hf.

The crystallization zones cover a length Z1 of the crucible and Z2 of the shaft of the (each) compaction means.

The aluminum purification device by segregation according to the invention, capable of forming a mass of very pure solid aluminum (or "bloom") by growth from a mass of liquid aluminum called the parent liquor, comprises a refractory crucibile, a furnace equipped with means of heating the crucible, means of forming crystals by partial crystallization on specific surfaces called crystallization zones, means of detaching the crystals, at least one means of compaction of the crystals and the bloom, means of vertically displacing the (each) compaction means, and the means of remelting the bloom by heating during growth, and is characterized in that it comprises means of measuring the height H of the solid mass and means of controlling the heating power of the heating means as a function of the measured height H. Preferably, control is carried out so as to give a determined rate of increase of the height, which is preferably decreasing with time. The remelting means are preferably capable of approximately continuously remelting the peripheral surface of the bloom.

According to one preferred embodiment, the device (1) according to the invention comprises a refractory crucible (2), a furnace (4) equipped with crucible heating means (5, 5a, 6, 6a, 7, 7a), at least one compaction means (12) and means of displacing the (each) compaction means vertically, and is characterized in that the (each) compaction means (12) comprises a shaft (9) and a compaction end piece (10) fixed to the said rod, and in that it comprises means of forming crystals (24, 25) by partial crystallization on the shaft (9) and on the internal surface (26) of the said crucible, in crystallization zones (29, 29a), and in that it comprises means (13, 14) of detaching the crystals from the shaft and from the internal surface, in that there is a free space (28) between the end piece (10) and the internal surface (26) of the said crucible which is sufficient to enable the passage of crystals detached by the said detachment means during their migration towards the bottom of the crucible under the effect of gravity, in that it comprises means of measuring the height H of the solid mass (22) during its growth, and in that it comprises means of controlling the heating power of the heating means as a function of the measured height H which can result in a rate of increase of the height H with time, which is preferably determined in advance.

According to one preferred embodiment of the invention, the device comprises only one compaction means.

The furnace (4) preferably comprises an insulating wall (40) and a metallic shell (41). The heating means (5, 5a, 6, 6a, 7, 7a) are preferably distributed along the crucible (2). It is advantageous to be able to control the heating means either individually or in groups, in order to be able to adjust the heating power along the crucible in a determined manner. In particular, this distribution of the heating means can be used to adjust the heating power applied adjacent to the entire bloom.

The device preferably comprises means of measuring the height H of the compacted mass (22) using the compaction means (12). For doing this, the device may comprise means of tracking the penetration of the compaction means into the liquid metal and deducing the height of the compacted bloom from this penetration, particularly during compaction operations. The device is preferably equipped with means of detecting the reaction force of the solid mass (22) in order to efficiently control compaction of the mass and to monitor its formation, which is given by its height H(t) above the bottom of the crucible with respect to time t.

Advantageously, the device comprises a means of comparing (for each compaction operation) the height actually compacted with a required reference height Ho(t) at the time of the compaction operation, and to control the heating power P as a function of the difference between H(t) and Ho(t). The device may comprise a means of controlling the heating power, preferably computerized, in order to increase the power when H>Ho and to reduce the power if H<Ho. This control means regulates the said heating means to achieve the required heating power.

The means of forming crystals on the shaft comprise cooling of the shaft by radiation and/or natural or forced convection when it is in the high (emersed) position. The means of forming crystals on the internal surface of the crucible includes lowering of the temperature of the surface by a heat sink effect. The crucible surface in the crystallization area (29) may be cooled efficiently by prolonging the wall of the crucible above the heated area, or even outside the furnace (4) by a sufficient length to induce thermal losses particularly by radiation and convection. The aerial (or protruding) part (32) of the crucible then acts as a heat sink due to the radiating fin effect. The length (Le) of the aerial part (32) as measured from the upper part (33) of the container (3) is typically between 2 and 15 cm for a device with a capacity of 2 tons and for a wall thickness T of the order of 5 cm.

Partial crystallization takes place and leads to the formation of crystals in crystallization zones (29) and (29a) when the temperature on the surface of the crucible walls and the shaft is below the liquidus temperature of the parent liquor. In these zones, the net heat flow is then directed from the liquid metal towards the crucible surface and towards the rod.

The lower limit of the crystallization zone (29) on the crucible corresponds to the location on the internal surface at which the temperature is equal to the liquidus temperature. The zone located below the crystallization zone corresponds to the "remelting" zone (31) (FIG. 3). The narrow transition area between the crystallization zone and remelting zone is called the "neutral point". In the remelting zone, the heat flow is directed from the crucible surface towards the metal and the temperature of the wall is greater than the liquidus temperature of the metal. The ratio between the height of the crystallization zone (Lc) and the height of the remelting zone (Lr) on the crucible is preferably less than 0.3, and more preferably less than 0.25. In practice, remelting only occurs around the compacted solid mass (22), such that the effective remelting area (23) covers the bottom of the crucible and its surface up to a height H. Thus, the bloom is remelted approximately over its entire peripheral surface, including the top part of this surface.

It is also advantageous to insert a thermal screen (34) between the crucible and the heating means (5 and 5a) in the upper part of the furnace, the said screen preferably covering an area that is slightly greater than the crystallization zone (29). This screen fixes the approximate position of the neutral point separating the crystallization zone and the remelting zone on the inside surface of the crucible, and eliminates a strong source of variability of this position when the heating power varies.

The section of the shaft is preferably less than the section of the end piece. The free space (28) left between the periphery of the end piece on the compaction means and the internal surface of the crucible is preferably such that crystals can accumulate at the bottom of the crucible as quickly as they are detached from the shaft and the wall of the crucible by the detachment means. The distance D between the end piece and the internal surface of the crucible is advantageously such that the detached crystals are submitted to a washing of phenomenon as they drop towards the bottom of the crucible. This phenomenon occurs when crystals pass close to the wall in an area in which the liquid aluminum is at a slightly higher temperature than the liquidus temperature, which causes partial remelting of the surface of the crystals, which is richer in impurities than the central part, thus improving purification. Preferably, the distance D is approximately uniform and is greater than or equal to 30 mm, and more preferably between 50 and 100 mm. If the distance is too large, the tamping area (15) is small and this reduces the efficiency of the compaction operation. Under these conditions, the end piece tends to push the crystals towards the crucible sidewall forcing them to pass close to the surface of the sidewall where the temperature of the liquid aluminum is slightly higher than the liquidus temperature. It is also advantageous when the compaction means is in the high position, if the lower part of the end piece remains below the neutral point in order to encourage the washing phenomenon.

The free space (28a) between the shaft (9) and the internal wall (26) of the crucible is such that the detachment means (13, 14) can move without being encumbered and such that the crystals (24, 25) can form quickly. The section of the shaft (9) is preferably circular and its diameter is preferably between 20% and 35% of the inside diameter of the crucible. If the diameter is too small, the mechanical strength may be insufficient to compact the bloom, possibly resulting in an insufficient crystal formation ratio caused by a limitation of the eliminated heat flow. If the diameter is too large, the immersed volume may be such that the useful capacity of the crucible is limited excessively, limiting correspondingly the productivity.

The shaft (9) and the end piece (10) are preferably made entirely or partly of graphite, which considerably limits risks of pollution of the liquid aluminum. The high thermal conductivity of graphite efficiently cools the shaft in its crystallization zone (29a), quickly removing thermal energy resulting from crystallization. The shaft (9) is also preferably made entirely or partly from graphite treated against oxidation by air by impregnation of a compound such as aluminum or zinc phosphate, phosphoric acid or a mixture of these products, or boric acid. The surface of the shaft could also be partially impregnated by an anti-abrasion compound such as SiC. It is also advantageous to apply a ceramic coating or sheathing such as a silicon carbide sheath or a Sialon (silicon aluminum oxynitride) sheath to the shaft (9), in order to prevent oxidation and abrasion of the rod. These arrangements prevent the production of graphite particles that are usually separated by oxidation and are entrained by detachment means and thus find their way into the bloom. These particles can have damaging effects such as the formation of gas bubbles or local decohesion close to graphite particles, when the purified metal is used.

The upper part (27) of the end piece (10) is advantageously in the shape of a truncated cone, as shown on FIG. 4a. The cone angle, in other words the angle $\alpha$ between the axis C of the shaft and the surface (27) of the cone is preferably between 30° and 60°, and more preferably between 40° and 50°. If the cone angle is too high, in other words if it is greater than the angle of natural slope of crystals, crystals can accumulate on the truncated cone shaped surface (27) reducing the global efficiency of the device since these crystals do not participate in formation of the bloom (22) and complementary purification by remelting. A very small cone angle would give a very long end piece which occupies an appreciable proportion of the useful volume of the crucible, and correspondingly reduces the quantity of aluminum loaded in a crucible, on which the purification operation can be carried out. Secondly, the increased length of the end piece significantly reduces the shaft length usable to form scalpable crystals, in other words crystals that can easily be detached by the detachment means (13).

Figure 4:
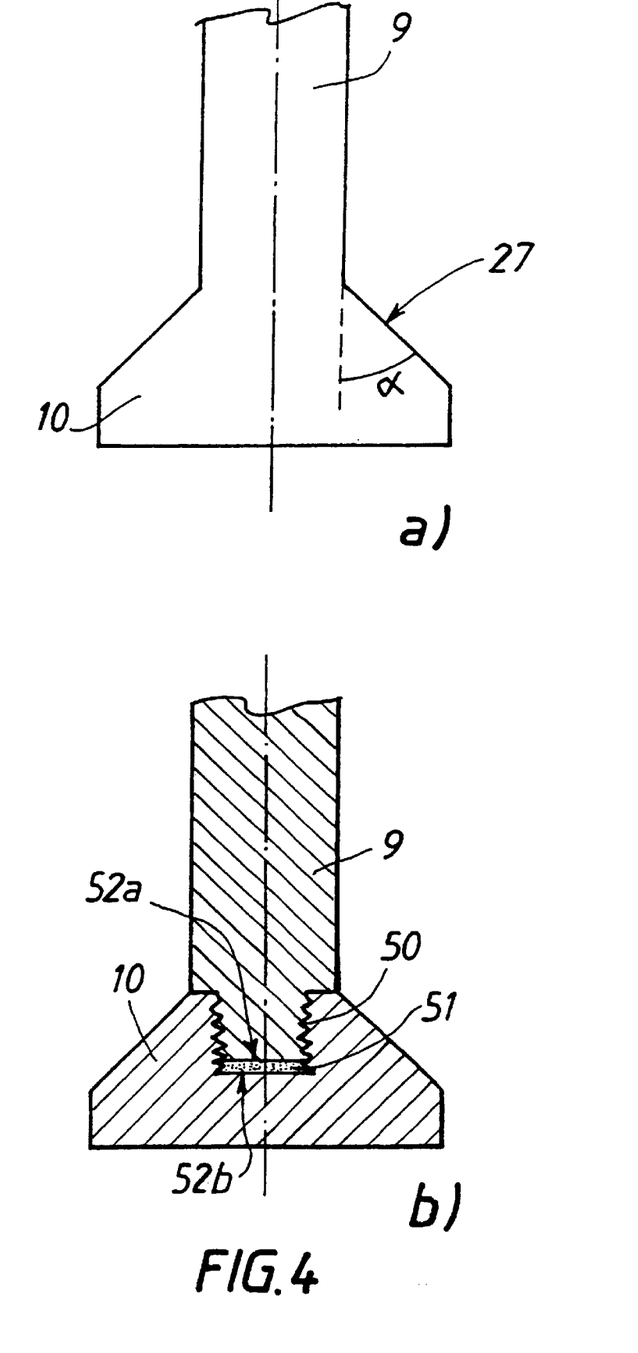
FIG. 4 shows preferred embodiments of the end piece used in the compaction means of the device according to the invention.

It is also advantageous to form ducts (11) in the end piece (10) of the compaction means, between the lower surface called the tamping surface (15), and the upper surface (27) of the end piece, which improves the flow of the liquid metal, particularly during the compaction operation of the solid mass (22).

According to an advantageous variant of the invention, the end piece (10) and the shaft (9) form two distinct, although attached, parts and the thermal conductivity of the joint between these two parts is small, in other words at least 10 times smaller than the thermal conductivity of the rod, in order to setup at least a partial thermal break between the shaft and the end piece. This thermal break can significantly reduce cooling of the end piece through the rod, particularly when the shaft is in the high position and is close to the surface of the liquid aluminum (as is the case at the end of the purification cycle) which limits the formation of crystals on the surfaces of the end piece, since it is difficult, or even impossible, for the detachment means to access the crystals. The shaft and end piece are preferably made of the same material to avoid differential expansion problems, and preferably made of graphite. As shown in FIG. 4b, a preferred embodiment of this variant consists of making a screw joint (50) between the shaft and the end piece and placing a disk (51) made of the thermal insulating material over a large part of the contact surface between the two parts, preferably at least between the two plane parts (52a, 52b) in order to reduce the heat flow by at least 20% compared with an end piece and a shaft forming a single part. Preferably, the thermal conductivity of the insulating material is at least 10 times, and preferably at least 100 times, lower than the thermal conductivity of the rod.

According to one variant of the invention, the dimensions of the (each) compaction means and the crucible are such that, when the (each) compaction means is in the low position, the free surface of the liquid aluminum rises to approximately cover the entire crystallization zone (29) on the internal wall of the crucible, and such that when the (each) compaction means is in the high position, the free surface of the liquid aluminum drops such that the upper part of the crystal ring (25) formed in the said zone emerges at least partially from the liquid metal, and such that these crystals can be detached without the detachment means (and particularly their scrapers) penetrating into the liquid metal. This variant of the invention can reduce scraper wear, making work on detachment means less frequent, facilitating maintenance of the device and reducing risks of pollution of the parent liquor, which can give a higher and better controlled purification rate (particularly when the invention is used for purification of previously refined metal, or for "ultra-purification" in order to obtain purities exceeding 99.999%).

The detachment means (13) and (14) detach crystals (24, 25) by scraping the rod. Preferably, the device comprises means such that the crystal detachment operation takes place on the shaft while the (each) compaction means is rising, and on the surface of the crucible when the (each) compaction means is in the high (emersed) position. Also preferably, the detachment means (13) on the shaft comprise a means of positioning scalpers or scrapers (8) in contact with the shaft when the shaft starts to rise, and for moving them away once the shaft reaches its high position (cooling position). According to one particularly advantageous embodiment, the scrapers are kept at a determined level with respect to the edge of the crucible and the detachment operation takes place during the rising movement of the (each) compaction means. In practice, the scrapers can come into contact with the shaft only when the shaft is rising. According to one variant of this embodiment, the scrapers only cover part of the periphery of the shaft (about half), in other words their shape is approximately semi-circular, and the detachment operation takes place over the entire periphery of the shaft by a vertical movement combined with a shaft rotation movement.

The detachment means may be provided with a system for adjusting their position with respect to the free surface of liquid aluminum, to compensate for the drop in the level of the free surface as the compacted solid mass grows and reduces the total volume due to the difference in density between the liquid aluminum and solid aluminum.

According to a preferred embodiment of the invention, the device (1) is characterized that the crucible (2) has cylindrical symmetry about an axis C, called the axis of rotation, in that the device comprises means (17) of rotating the crucible about the rotation axis C, and in that the entire periphery of the crystallization zone (29) on the crucible is scraped by the combined vertical up and down movements of the detachment means (14) and rotation of the said crucible. This type of configuration considerably reduces the size of the detachment means (13, 14) and reduces the complexity of the mechanical systems necessary for independent actuation of the said means.

According to one preferred variant of this embodiment, the crucible (2) is inserted in a steel container (3) equipped with a collar (30), and the container (3) is supported on inclined tapered rollers (18) through a plate (16) supporting the crucible/container assembly. The tapered rollers enable easy rotation of the crucible, and also self-center the plate (16) with respect to the axis of the device. The crucible can be efficiently rotated by motor drive of one of the tapered rollers.

Blooms according to the invention may be obtained industrially using the device according to the invention, particularly by loading an initial mass of liquid aluminum to be purified, called the parent liquor, into the refractory crucible, formation of crystals by partial crystallization of the parent liquor in the crystallization zones on the shaft (29a) and on the wall of the crucible (29), detachment of the crystals using detachment means (13) and (14), periodic compaction of the accumulated crystals (21) and the solid mass (22) at the bottom of the crucible using the compaction means (12), in order to make a compact solid mass called the "bloom" grow gradually, partial gradual remelting of the solid mass in order to provide additional purification of the solid mass, regulation of the heating power of the heating means (5 to 7a) while the bloom is growing as a function of H to achieve a rate of increase of H which is preferably determined and decreasing, and the physical separation of the parent liquor and the final solid mass called the final bloom.

Crystals form on the shaft particularly when the shaft is immersed in the parent liquor, whereas they form almost continuously on the wall of the crucible.

During elementary purification cycles, the end piece (10) is preferably always immersed in the parent liquor to avoid the formation of crystals over the upper or lower surface, the crystals contribute to reducing the volume of the residual parent liquor and therefore to increasing its content in residual impurities without participating in the formation of the mass of compacted purified crystals.

The invention is also applicable to ultra-purification of aluminum which starts from aluminum with a purity of not less than 99.97%, to make aluminum with a minimum purity of 99.998%. Metal of this type is used particularly for metallization of integrated circuits. For this degree of purification, there is an additional difficulty in the need to eliminate radioactive impurities, and particularly uranium and thorium, as completely as possible. In general, the initial metal to be purified is already electrically refined and has very low contents of peritectic elements such as Ti, V, Zr and Cr (less than 1 ppm total), and very moderate contents of normal eutectic impurities such as Fe, Si, Cu (less than 5 ppm each). However, the uranium and thorium contents of this metal are unacceptable for metallization of integrated circuits, for example 0.1 ppm of thorium and more than 0.01 ppm of uranium, whereas current specifications of integrated circuit manufacturers require that combined contents of U+Th do not exceed 0.0007 ppm. This limitation to very low contents of radioactive impurities will only become more severe with the reduction in the size of elementary transistors used to make circuits and the requirements of manufacturers are tending towards limits of the total content of U+Th less than 0.0001 ppm, which means that the initial content of these impurities in the refined metal has to be divided by more than 1000. With processes according to prior art, the only way of obtaining quantities with radioactive impurities thus low is to carry out purification operations in cascade (for example two successive segregations) which considerably increases production costs and very significantly lowers the yield of the final purified metal compared with the initial electrorefined metal.

EXAMPLES

Test series 1

Industrial tests were carried out with devices with different capacities. In these devices, the compaction means was unique and did not go down as far as the bottom of the crucible. Under these conditions, compaction only starts when the solid mass reaches the maximum penetration position of the compaction means this is the moment at which the said "contact" takes place. This characteristic is a non-limitative variant of the device and the process according to the invention.

These tests related to three types of bloom growth curves or "rise curves")

a) Rise rate Vm significantly constant during the total growth period (Ttot) (prior art);

b) Rise rate comprising three constant rise rates: an initial constant rate equal to 1.5 times Vm for 10% of Ttot, followed by a constant rate equal to 1.2 times Vm for 20% of Ttot, finishing with a constant rate equal to 0.87 times Vm for 70% of Ttot; and c) Rise rate comprising eight constant rise rates: an initial constant rate equal to 2.4 times Vm for 5% of Ttot, followed by a constant rate equal to 2.0 times Vm for 10% of Ttot, followed by a constant rate equal to 1.6 times Vm for 10% of Ttot, followed by a constant rate equal to 1.2 times Vm for 15% of Ttot, followed by a constant rate equal to 0.9 times Vm for 15% of Ttot, followed by a constant rate equal to 0.65 times Vm for 20% of Ttot, followed by a constant rate equal to 0.375 times Vm for 20% of Ttot, finishing with a constant rise rate equal to zero during 5% of Ttot.

Table I shows the main dimensions of the furnaces used, growth parameters for blooms and average values of purification rates obtained in about 5 to 15 tests per rise curve and per furnace type. All these tests were made with a compaction cycle comprising a shaft emersion time of 23 seconds and an immersion time (crystallization and compaction position) of 15 seconds.

These tests demonstrate that the internal heterogeneity and the variation from one bloom to another in blooms produced with an approximately constant rise rate are significantly greater than the corresponding values for blooms obtained according to the invention. It is also observed that the average purity of the bloom is lower when the crucible diameter is higher—the present inventor explains this particularly by the fact that the peripheral part of the bloom where the purity level is highest varies inversely with the diameter of the bloom, and therefore with the diameter of the crucible.

These tests also show that the production of crystals on the shaft (typically about 40% in these tests) of the compaction means and on the internal wall of the crucible (about 60%) can considerably increase the rate at which partially crystallized crystals are produced without requiring cooling capacities that are unacceptable in terms of production or investment costs. This could possibly be explained by fast accumulation at the bottom of the crucible related to the space between the end piece and the wall of the crucible, and by the use of a shaft that is also used for crystallization so that this step no longer forms a limitation, and a crystal washing effect as the crystals drop through a rising current of hot liquid aluminum.

Figure 6:
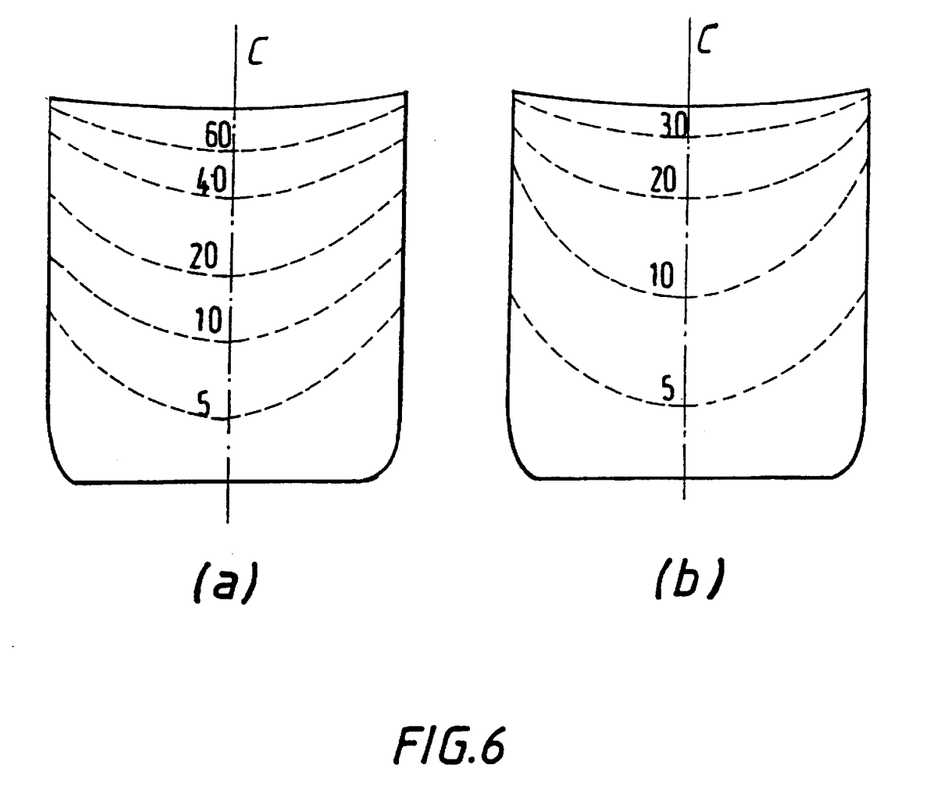
FIG. 6 shows profiles of silicon isocontents (contents in ppm) typically observed in blooms according to prior art (a) and according to the invention (b). These blooms have a circular symmetry with respect to the C axis.
Figure 7:
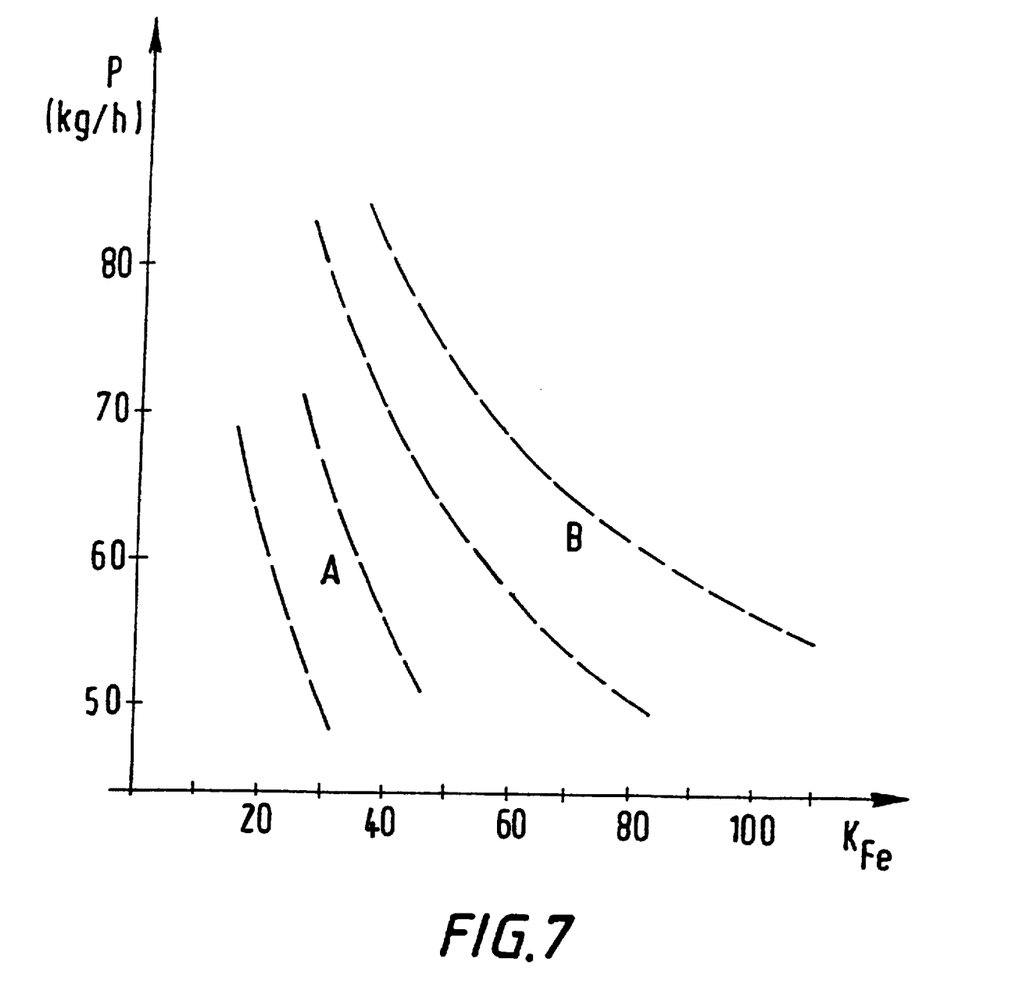
FIG. 7 graphically illustrates typical values of the industrial productivity P (in kg/h) and the average effective purification ratio K (dimensionless) according to prior art (A) and according to the invention (B). The purification ratio is equal to the ratio between the average contents of one or several given elements in the initial metal and in the purified metal. The most characteristic elements are usually major impurities of primary aluminum produced by electrolysis, namely iron and silicon.

The present inventor attempted to understand the reasons for this surprising improvement in the average purity of the blooms, which is obtained using very convex crystal rise curves (in other words with a rise speed that decreases strongly as the previously compacted height increases). For doing so a diametrical wafer (axial "section" through the blooms) was taken on a bloom made according to Example 3 and on a bloom made according to Example 7. A spark spectrometry analysis of the silicon and iron content was carried out on a series of samples taken over the entire surface of these wafers. This analysis was used to make a map of the iron and silicon contents of the metal as a function of the position of the samples in each axial wafer through the bloom. FIG. 6 shows the results obtained for silicon contents in the form of "iso level curves" (isocontents) of silicon. These curves show that the content of silicon in blooms produced according to Example 3 (FIG. 6a) increases strongly with the compacted height starting from the bottom of the crucible and that this growth in the silicon content with the height is much less in the case of the bloom generated in Example 7 (FIG. 6b). Furthermore, better purification of the external ring of the bloom is observed in the latter case than in the former case, particularly in the "top" part of the bloom.

Note also that for the bloom generated in Example 7, only very moderate sawing on the "head" is necessary to eliminate the majority of the least purified part of the bloom (for which silicon contents are greater than 25 to 30 ppm). Sawing the bloom head by the order of 5 to 8% can then give very high average purities on the solid met al remaining after sawing.

However, in the case of blooms produced according to Example 3, it is observed that the area in which the purity is lower is much larger, and it is understandable that even extensive sawing (therefore significantly reducing productivity, in other words the final net weight of the sawn bloom for exactly the same production time) only marginally improves the average purity of the remaining metal after sawing.

These results show that the homogeneity of the composition of the blooms obtained is better, and that on average this composition is much purer for very convex rise curves of type c).

Test series 2

In order to evaluate the influence of the better homogeneity of the internal composition of individual blooms obtained by adopting convex rise curves type c), the present inventor carried out analyses on 90 blooms obtained from a primary metal with an approximately constant composition (namely with an iron content of between 280 and 320 ppm inclusive and a silicon content of between 180 and 220 ppm inclusive), during a production check. The 90 corresponding segregation operations were carried out in large crucibles with a capacity of 2000 kg of liquid aluminum, with a bloom rise time of 18 hours after contact time. 45 of these 90 operations were carried out with linear rise curves type a) and 45 were carried out using convex rise curves type c). After the end of compaction, the impure liquid was eliminated and all blooms were allowed to drip for a minimum time of 40 minutes—the paste at the top rich in impure residual liquid was also scraped after dripping, using a graphite spiral, in order to eliminate this more impure zone over a depth of about 8 cm (more precisely between extreme values of 5 and 10 cm). After scraping and dripping, and cooling, the cold solid blooms were extracted from the crucible and weighed in this rough (raw) state. Their weight varied between 1370 kg and 1460 kg, with an average weight of 1405 kg (there was no difference between the two bloom populations, in other words the population resulting from a rise type a) and the population resulting from a rise type c), in this respect). All blooms were then sawn at the top, with the objective of producing a constant length of residual sawn bloom corresponding to a net weight equal to 1300 kg±10 kg of residual bloom after sawing. The 45 type a) blooms and the 45 type c) blooms were then remelted separately in groups of 3 blooms (therefore 15 remelting operations for type a) blooms and 15 remelting operations for type c) blooms), in a furnace with the capacity of 4 tons, heated by radiating tubes and with a very pure alumina lining. A prior check had been carried out that the furnace only very slightly polluted the metal during this remelting (iron intake less than 0.3 ppm and silicon intake less than 1.0 ppm). Samples of the remelted metal were taken and their iron and silicon contents were analyzed after each remelting operation. These analyses showed that:
- for the 15 remelting operations on three type a) blooms, the average iron content of the remelted metal was 8.3 ppm, with values varying from 3.4 ppm to 14.7 ppm (therefore with a difference between the extreme values of 11.3 ppm), and the silicon content of the remelted metal was 28 ppm with values varying from 15 ppm to 51 ppm (therefore with a difference of 36 ppm between extreme values)
- for the 15 remelting operations on three type c) blooms, the average iron content of the remelted metal was 3.0 ppm, with values varying from 1.4 ppm to 5.2 ppm (therefore with a difference between the extreme values of 3.8 ppm), and the average silicon content of the remelted metal was 12 ppm with values varying from 6.4 ppm to 18 ppm (therefore with a difference of 11.6 ppm between extreme values).

Therefore these checks show that very convex type c) rise curves can give greater average purities of the segregated metal than can be obtained with linear type a) rise curves, and also that purity dispersions are much lower, in other words the variability is lower. This improvement is important, since in industrial production it is impossible to analyzed segregated blooms before they are remelted: for cost reasons, they are remelted in batches as large as possible. In this case, a strong dispersion of the purity from bloom to bloom increases the risks that a complete casting batch may have to be scraped because the required purity is not achieved, if one or several blooms significantly exceed target limits for impurity contents. In general, to limit these risks in industrial production, the target average content of impurities in blooms is of the order of the maximum allowable content minus twice the dispersion of bloom to bloom contents. Under these conditions a large dispersion increases purification costs, by making it necessary to search for a higher average purity.

Test series 3

Industrial tests on the ultra-purification of 99.99% aluminum to produce aluminum with a minimum purity of 99.9995% were also carried out according to the invention, using very convex type c) rise curves, and using ultra-pure graphite crucibles in order to limit risks of metal pollution by impurities in the refractory materials from which normal crucibles are made. This graphite crucible, with an average inside diameter of 600 mm and a height of 2000 mm and protected on the inside by a mold release agent based on very pure alumina bonded by an alumina gel prebaked at 700 C., was loaded with 1310 kg of electrorefined aluminum with composition Fe=2 ppm, Si=3 ppm, Cu=2 ppm, Th=0.12 ppm, U=0.02 ppm, Ti+V+Zr=0.5 ppm. After contact, the crystals rose in 20 hours with a type c) curve with a target final weight of the compacted bloom (before scraping and dripping) of 880 kg. After the end of the operation, the residual impure liquid was drained by tilting, the top of the bloom was scraped over a depth of 100 mm by a graphite spiral, and dripping was prolonged in the tilted position for 1 hour. The dripped bloom was then allowed to cool and it was extracted from its crucible (its gross weight was then 780 kg) The rough bloom was then sawn at the bottom (eliminating 35 kg) and at the top (eliminating an 80 kg "disk"), and then a peripheral layer about 1 cm thick was removed by turning to eliminate all traces of mold release agent that could have contaminated the solidified mass. After these operations, the net weight of the bloom after being sawn at the top and bottom and being turned, was 630 kg. Finally, this bloom was remelted in an ultra-pure graphite furnace and the metal thus remelted was analyzed by glow discharge mass spectrometry. The content of impurities thus analyzed was Fe<0.2 ppm, Si=0.25 ppm, Cu=0.3 ppm, Ti+V+Cr+Zr<0.3 ppm total, U$\leq$0.05 ppb and Th$\leq$0.05 ppb (detection limit).

This test shows that the content of peritectic impurities in the remelted metal is less than the peritectic content of the initial electrorefined metal, although it is normally accepted that peritectic elements concentrate preferentially in the solidified part of the metal. An analysis of the 35 kg block sawn at the bottom of the bloom revealed a high content of peritectic elements. Therefore, the present inventor concluded that the observed result is due to purification mechanisms that, contrary to conventional wisdom encourage the concentration of peritectic elements at the bottom of the bloom, where they can be eliminated by moderate sawing. This phenomenon was also observed in blooms of 4N metal obtained from primary metal with a content of 99.6% to 99.93%.

The test also showed that the observed purification coefficients of U+Th radioactive impurities are much better (the ratio between the initial content of thorium in the metal to be refined and the final content in the sawn and scalped bloom was greater than 2400), and are much higher than the solid/liquid equilibrium coefficients (of the order of 100 to 200 in the case of thorium and uranium), while maintaining a very appreciable "final purified metal/initial metal" yield (630 kg/1310 kg=48%).

Therefore the improvement in the observed purification coefficients achieved by the use of convex type c) rise curves is confirmed in the case of ultra-purification of previously refined metal, and can very significantly reduce ultra-pure metal production costs for electronic applications. The test also showed that it is advantageous to include a sawing operation on the bottom of the bloom obtained according to the invention, in order to reduce the content of some peritectic elements.

TABLE I

| Example | Crucible height (mm) | Crucible diameter (mm) | Rough bloom weight (kg) | Sawn bloom weight (kg) | Rise time (h) | Rise type | Purity | | | |
|---|---|---|---|---|---|---|---|---|---|---|
| | | | | | | | Rough bloom | | Sawn bloom | |
| | | | | | | | KFe | KSi | KFe | KSi |
| 1 | 1650 | 650 | 670 | 630 | 12 | a) | 30 | 7 | 35 | 8 |
| 2 | 2050 | 800 | 1400 | 1300 | 12 | a) | 20 | 5 | 25 | 6 |
| 3 | 2050 | 800 | 1400 | 1300 | 16 | a) | 25 | 6 | 30 | 7 |
| 4 | 1650 | 650 | 670 | 630 | 12 | b) | 40 | 9 | 50 | 11 |
| 5 | 2050 | 800 | 1400 | 1300 | 16 | b) | 30 | 7 | 40 | 9 |

TABLE I-continued

| Example | Crucible height (mm) | Crucible diameter (mm) | Rough bloom weight (kg) | Sawn bloom weight (kg) | Rise time (h) | Rise type | Purity Rough bloom | | Purity Sawn bloom | |
|---|---|---|---|---|---|---|---|---|---|---|
| | | | | | | | KFe | KSi | KFe | KSi |
| 6 | 2050 | 800 | 1450 | 1300 | 12 | c) | 45 | 9 | 60 | 12 |
| 7 | 2050 | 800 | 1400 | 1300 | 16 | c) | 60 | 11 | 90 | 16 |
| 8 | 2050 | 800 | 1450 | 1300 | 20 | c) | 100 | 15 | 180 | 22 |
| 9 | 2050 | 800 | 1400 | 1260 | 20 | c) | 120 | 16 | 200 | 25 |

The process according to the present invention can control the time necessary to form blooms with a given mass, thus improving better production and work position management.

The process and device according to the invention are suitable for automation (at least partially) and computerization. Furthermore, they can achieve a higher purity of the segregated metal for constant productivity, or can significantly improve the productivity for a constant purity.

The disclosures of the priority documents, French Application No. 99/00247 filed Jan. 8, 1999, and International Application No. PCT/FR00/00010 filed Jan. 5, 2000, are incorporated by reference herein in their entireties.

What is claimed is:

1. A process, for segregating a bloom of purified solid aluminum from a parent liquor, that is carried out in a device comprising a refractory crucible, used to hold the bloom and the parent liquor;

a means for heating the crucible;

a means for detaching crystals from crystallization zone surfaces of the device;

at least one means for compacting detached crystals; and a means for displacing vertically the means for compacting, the process comprising growing the bloom in the crucible at the bottom of the crucible, wherein the growing comprises:

forming aluminum crystals by crystallization on at least one of the crystallization zone surfaces that has a temperature less than a liquidus temperature of the parent liquor;

detaching the aluminum crystals from the at least one of the crystallization zone surfaces using the means for detaching to form detached aluminum crystals;

allowing the detached aluminum crystals to migrate towards the bottom of the crucible under the effect of gravity;

accumulating the detached aluminum crystals on a top surface of the bloom;

compacting the detached aluminum crystals on the bloom and said bloom using the at least one means for compacting; and partially remelting the bloom using the means for heating, wherein the process further comprises:

measuring a height H of the bloom during the growing; and adjusting a heating power P of the means for heating as a function of the height H so as to obtain a predetermined variation in a rate of change of the height H that decreases with time.

2. The process according to claim 1, wherein the heating power P is adjusted as a function of the difference between the measured height H and a predetermined set value Ho, where Ho is variable with time.

3. The process according to claim 1, wherein the height H is measured using the at least one means for compacting.

4. The process according to claim 1, further comprising, at the end of the growing, physically separating a residual parent liquor from the bloom.

5. The process according to claim 4, wherein the separating is carried out when the bloom has reached a predetermined height Hf.

6. The process according to claim 1, wherein the crystallization zone surfaces include a portion of an internal wall of the crucible and a part of the at least one means for compacting.

7. The process according to claim 6, further comprising emersing from the parent liquor the part of the at least one means for compacting to cool the part to a temperature below the liquidus temperature of the parent liquor; and then immersing the part in the parent liquor to form crystals on the part.

8. The process according to claim 7, wherein the part is emersed from the parent liquor for an emersion time Te;

the part is immersed in the parent liquor for an immersion time Ti; and

Te/Ti is greater than 1.

9. The process according to claim 8, wherein the compacting comprises pressurizing the bloom using the at least one means for compacting; and maintaining pressure on the bloom for a time period approximately equal to the immersion time Ti.

10. The process according to claim 7, wherein the detaching of aluminum crystals is performed when the portion of the internal wall of the crucible and the part of the at least one means for compacting are emersed from the parent liquor.

11. The process according to claim 7, wherein the detaching of aluminum crystals is performed when the part of the at least one means for compacting is being emersed from the parent liquor.

12. The process according to claim 7, wherein the migration of crystals towards the bottom of the crucible takes place when the part is emersed from the parent liquor.

13. The process according to claim 7, wherein the at least one means for compacting and the crucible are so dimensioned that when the part of the at least one means for compacting is immersed in the parent liquor, the free surface of the parent liquor rises to cover practically the entire portion of the internal wall of the crucible, and when the part of the at least one means for compacting is immersed from the parent liquor, the free surface of the parent liquor drops such that at least a portion of a ring of crystals formed on the portion of the internal wall of the crucible emerges from the parent liquor and that the crystals can be detached without the detachment means contacting the parent liquor.

14. The process according to claim 1, further comprising sawing off at least one of the top and the bottom of the bloom.

15. An aluminum purification device, for growing by segregation a bloom of purified solid aluminum from a parent liquor, the device comprising a refractory crucible, used to hold the bloom and the parent liquor;

a furnace equipped with a means for heating the crucible;

a means for forming aluminum crystals on crystallization zone surfaces of the device;

a means for detaching the aluminum crystals from the crystallization zone surfaces;

at least one means for compacting detached aluminum crystals and said bloom;

a means for displacing vertically the means for compacting;

a means for partially remelting the bloom during growth;

a means for measuring a height H of the bloom; and a means for regulating a heating power P of the means for heating as a function of the height H so as to obtain a determined variation in a rate of change of the height H that decreases with time.

16. The device according to claim 15, wherein the means for compacting comprises a shaft and a compaction end piece rigidly fixed to the shaft;

the crystallization zone surfaces include a portion of an internal wall of the crucible and a part of the shaft; and the device further comprises a free space between the compaction end piece and the internal wall of the crucible that is sufficient to enable the passage of crystals detached by the means for detaching as the crystals migrate towards the bottom of the crucible under the effect of gravity.

17. The device according to claim 15, wherein the means for regulating a heating power P controls the heating power P as a function of the difference between H and Ho, where Ho is a predetermined set value that is variable with time.

18. The device according to claim 15, wherein the at least one means for compacting consists of a single means for compacting.

19. The device according to claim 18, wherein the means for measuring a height H comprises the at least one means for compacting.

20. The device according to claim 16, wherein the means for forming aluminum crystals comprises a means for dropping the temperature of the internal wall due to a heat sink effect.

21. The device according to claim 16, wherein the means for forming aluminum crystals comprises a means for cooling the shaft when the part of the shaft is emersed from the parent liquor.

22. The device according to claim 16, wherein the free space forms an annulus having an approximately uniform width equal to or greater than 30 mm.

23. The device according to claim 16, wherein the shaft and the compaction end piece are entirely or partly made of graphite.

24. The device according to claim 16, further comprising a means for protecting the shaft against at least one of oxidation and abrasion.

25. The device according to claim 16, wherein the shaft is entirely or partly made of graphite treated against oxidation in air by impregnation with a compound selected from the group consisting of aluminum phosphate, zinc phosphate, phosphoric acid, a mixture thereof, and boric acid.

26. The device according to claim 16, wherein the shaft comprises a surface impregnated with an anti-abrasion compound.

27. The device according to claim 16, further comprising a ceramic coating or sheathing applied to the shaft, wherein the ceramic coating or sheathing is selected from the group consisting silicon carbide and silicon aluminum oxynitride.

28. The device according to claim 16, wherein an upper part of the compaction end piece forms a truncated cone.

29. The device according to claim 16, wherein the compaction end piece comprises a lower surface; an upper surface; and ducts between the lower surface and the upper surface.

30. The device according to claim 16, wherein the compaction end piece and the shaft are connected at a joint; and the thermal conductivity of the joint is at least 10 times lower than the thermal conductivity of the shaft.

31. The device according to claim 16, wherein the at least one means for compacting and the crucible are so dimensioned that when the at least one means for compacting is in a low position, the free surface of the parent liquor rises to cover practically the entire portion of the internal wall of the crucible, and when the at least one means for compacting is in a high position, the free surface of the parent liquor drops so that at least a portion of a ring of crystals formed on the portion of the internal wall of the crucible emerges from the parent liquor and that said crystals can be detached without the detachment means contacting the parent liquor.

32. The device according to claim 16, wherein the means for detaching detaches crystals from the shaft when the at least one means for compacting is being emersed from the parent liquor; and the means for detaching detaches crystals from the internal wall of the crucible when that at least one means for compacting is sufficiently emersed from the parent liquor so that the means for detaching can detach the crystals from the internal wall without contacting the parent liquor.

33. The device according to claim 16, wherein the crucible is cylindrically symmetric about an axis of rotation C; and the device further comprises a means for rotating the crucible about the axis of rotation C while the means for detaching scrapes the portion of the internal wall of the crucible.

34. The device according to claim 16, wherein the crucible is inserted in a steel container fitted with a collar; and the container is supported on inclined tapered rollers via a plate supporting the crucible and container.

35. The device according to claim 15, further comprising a heat shield between the means for heating and the crucible.

36. The process according to claim 1, further comprising
 initially forming the parent liquor from aluminum having a purity of at least 99.97%; and
 obtaining a bloom of aluminum having a purity of at least 99.998%.

37. A method of using an aluminum purification device, the method comprising purifying aluminum having a purity of at least 99.97% in the device of claim 15 to obtain aluminum having a purity of at least 99.998%.

* * * * *